(12) United States Patent
Cao (10) Patent No.: US 9,811,227 B2
(45) Date of Patent: Nov. 7, 2017

(54) ARRAY SUBSTRATE AND DISPLAY PANEL (71) Applicants: SHANGHAI TIANMA MICRO-ELECTRONICS CO., LTD., Shanghai (CN); TIANMA MICRO-ELECTRONICS CO., LTD, Shenzhen (CN)

(72) Inventor: Zhaokeng Cao, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 39 days.

(21) Appl. No.: 15/005,477

(22) Filed: Jan. 25, 2016

(65) Prior Publication Data
US 2016/0291727 A1 Oct. 6, 2016

(30) Foreign Application Priority Data

Apr. 1, 2015 (CN) .......................... 2015 1 0153185
Jul. 17, 2015 (CN) .......................... 2015 1 0422743

(51) Int. Cl.
G06F 3/044 (2006.01)
G06F 3/041 (2006.01)
(Continued)

(52) U.S. Cl.
CPC ............ G06F 3/044 (2013.01); G06F 3/0412 (2013.01); G02F 1/13338 (2013.01); G02F 1/136286 (2013.01)

(58) Field of Classification Search
CPC combination set(s) only.
See application file for complete search history.

(56) References Cited

U.S. PATENT DOCUMENTS 6,222,528 B1 * 4/2001 Gerpheide ............. G06F 3/044
345/173
9,024,913 B1 * 5/2015 Jung ....................... G06F 3/044
178/18.06
(Continued)

FOREIGN PATENT DOCUMENTS

CN 102937852 2/2013
CN 103809316 A 5/2014
(Continued)

OTHER PUBLICATIONS

Chinese Application No. 201510422743.2, First Office Action dated Jul. 3, 2017.

Primary Examiner — Van Chow
(74) Attorney, Agent, or Firm — Alston & Bird LLP (57) ABSTRACT An array substrate for a self-capacitive touch display panel is provided. The array substrate includes a common electrode layer, a wire layer; an insulating layer, a first electrode block, a plurality of first interconnection structures and a plurality of second interconnection structure. The common electrode layer includes a plurality of touch electrodes, the wire layer includes a plurality of touch wires, and the insulating layer is disposed between the common electrode layer and the wire layer. Each touch electrode is electrically connected with a corresponding touch wire through the first interconnection structure. The first electrode block is in the same layer as the common electrode layer, and is separated and insulated from the plurality of touch electrodes. The first electrode block is electrically connected with the touch wire through the second interconnection structure. Accordingly problems associated with low quality display in conventional display panels are solved.

11 Claims, 8 Drawing Sheets (51) Int. Cl.
*G02F 1/1333* (2006.01)
*G02F 1/1362* (2006.01)

(56) References Cited

U.S. PATENT DOCUMENTS

| | | | |
|---|---|---|---|
| 2010/0295807 A1* | 11/2010 | Xie | G06F 3/0414 |
| | | | 345/173 |
| 2013/0342801 A1* | 12/2013 | Hamada | G06F 3/0412 |
| | | | 349/141 |
| 2014/0111473 A1 | 4/2014 | Yang et al. | |
| 2014/0118642 A1 | 5/2014 | Wang et al. | |
| 2014/0132534 A1* | 5/2014 | Kim | G06F 3/0412 |
| | | | 345/173 |
| 2015/0378390 A1 | 12/2015 | Liu et al. | |
| 2016/0216802 A1* | 7/2016 | Bao | G06F 3/0412 |
| 2016/0291775 A1* | 10/2016 | Li | G06F 3/044 |
| 2017/0090620 A1* | 3/2017 | Du | H01L 27/124 |

FOREIGN PATENT DOCUMENTS

| | | |
|---|---|---|
| CN | 104020893 A | 9/2014 |
| CN | 104102402 A | 10/2014 |

* cited by examiner

ARRAY SUBSTRATE AND DISPLAY PANEL

CROSS-REFERENCE TO RELATED APPLICATIONS

The present application claims priority to Chinese patent application No. 201510153185.4 filed on Apr. 1, 2015 and entitled "ARRAY SUBSTRATE, TOUCH DISPLAY PANEL AND DISPLAY DEVICE", and Chinese patent application No. 201510422743.2 filed on Jul. 17, 2015 and entitled "ARRAY SUBSTRATE AND DISPLAY PANEL", which are hereby incorporated by reference in their entirety.

BACKGROUND

In an initial development stage of touch display technology, a touch panel and a display panel are bonded together to form a touch display panel having a touch display function. The touch panel and the display panel are prepared separately, which results in a high thickness of the touch display panel, a high cost and a low productivity. Accordingly, a strong need in the market exists for a solution to remedy these problems.

SUMMARY

Embodiments of the present disclosure aim to provide an array substrate with high display performance. According to one aspect of the present disclosure, an array substrate used in a self-capacitive touch display panel is provided. The array substrate includes: a common electrode layer including a plurality of touch electrodes; a wire layer including a plurality of touch wires; an insulating layer disposed between the common electrode layer and the wire layer, wherein each touch electrode is electrically connected with a corresponding touch wire through a first interconnection structure; and a plurality of first electrode blocks disposed in a same layer as the common electrode layer, wherein the plurality of first electrode blocks are separated and insulated from the plurality of touch electrodes, and the plurality of first electrode blocks are electrically connected with the plurality of touch wires through a plurality of second interconnection structures.

According to another aspect of the present disclosure, a display panel is provided. The display panel includes the array substrate described above, a color film substrate disposed opposite to the array substrate; and a light shielding layer disposed on a side of the color film substrate toward to the array substrate, wherein the wire layer and the first electrode block are disposed below the light shielding layer.

Inventors of the present disclosure found that, in the conventional touch display panel, through holes for connecting the touch electrodes and the touch wires are distributed unevenly in the common electrode layer, which results in a problem of low quality display. In order to improve display performance of the conventional display panel, an array substrate and a display panel are provided in embodiments of the present disclosure. Compared with the conventional technology, embodiments of the present disclosure have following advantages. Both of the first interconnection structure and the second interconnection structure penetrate the insulating layer and are arranged uniformly, so that uniformity of graphics in the display area is guaranteed and uniformity of image displayed by the array substrate and the display panel is improved. Therefore, the problem of low quality display in the conventional display panel can be solved.

BRIEF DESCRIPTION OF THE DRAWINGS

In order to clarify the technical solution of the present disclosure, the figures used in the description of embodiments of the present disclosure will be briefly described hereunder. Obviously, there figures only refer to preferred embodiments of the present disclosure, and various changes may be made by those skilled in the art without departing from the spirit or scope of this disclosure.

DETAILED DESCRIPTION

With the development of self-capacitive touch display technology, common electrodes on an array substrate of the display panel can be used as touch sensing electrodes for self-capacitive touch detection. Based on a time-division driving technology, a touch control operation and a display control operation can be performed on the common electrodes in different time periods, so as to realize both of the touch function and the display function. Accordingly, the touch sensing electrodes can be integrated into the display panel, such that the production cost can be reduced, the production efficiency can be improved and the thickness of the touch display panel can be reduced.

The common electrodes may be used as touch sensing electrodes. In this case, the common electrode layer may be divided into a plurality of common electrode blocks. Meanwhile, in order to achieve touch function and display function in different time periods, each common electrode block needs an individual wire for providing voltage signals. By the wire, a touch sensing signal is provided to a corresponding common electrode block in touch time period, and a display driving voltage is provided to a corresponding electrode block in display time period.

In order to clarify the objects, characteristics and advantages of the disclosure, the embodiments of the present disclosure will be described in detail in conjunction with the accompanying drawings. The present disclosure is not limited to the embodiments disclosed. It will be understood by those skilled in the art that various changes may be made without departing from the spirit or scope of the disclosure.

Figure 1:
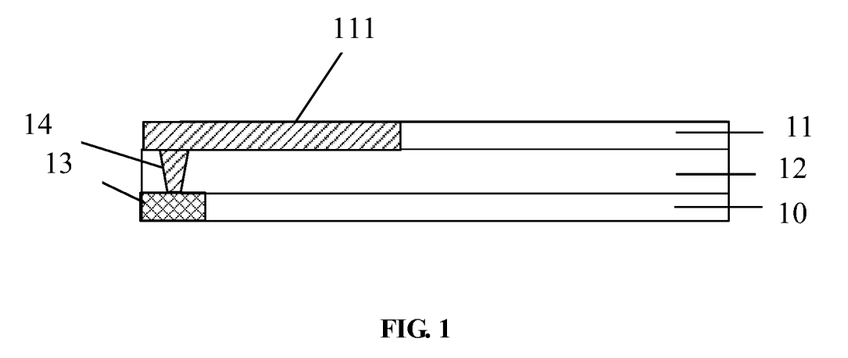
FIG. 1 schematically illustrates a partial cross-sectional view of an array substrate according to one embodiment of the present disclosure.
Figure 2:
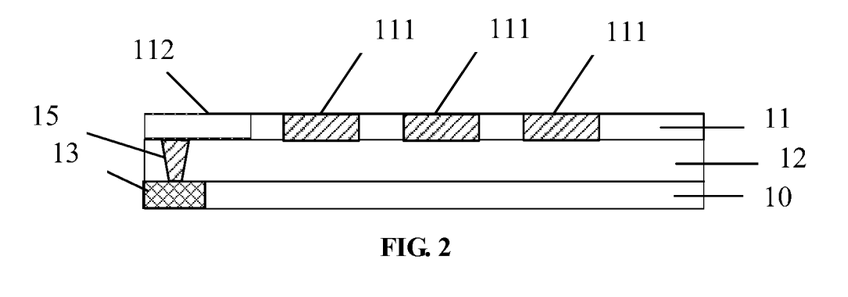
FIG. 2 schematically illustrates another partial cross-sectional view of the array substrate according to one embodiment of the present disclosure.

With reference to FIG. 1 and FIG. 2, FIG. 1 illustrates a partial cross-sectional view of an array substrate according to one embodiment of the present disclosure, and FIG. 2 illustrates another partial cross-sectional view of the array substrate. The array substrate includes: a common electrode layer 11, a wire layer 10, an insulating layer 12, a touch wire 13, a touch electrode 111, a first electrode block 112, a first interconnection structure 14 and a second interconnection structure 15.

In some embodiments, the common electrode layer 11 includes a plurality of touch electrodes 111, the wire layer 10 includes a plurality of touch wires 13, and the insulating layer 12 is disposed between the common electrode layer 11 and the wire layer 10. As shown in FIG. 1, each touch electrode 111 is electrically connected with a corresponding touch wire 13 through the first interconnection structure 14. As shown in FIG. 2, the first electrode block 112 is in a same layer as the common electrode layer 11, and the first electrode block 112 is separated and insulated from the plurality of touch electrodes 111, and the first electrode block 112 is electrically connected with the touch wire 13 through the second interconnection structure 15.

From above, the touch wire 13 in FIG. 1 can be electrically connected with the touch electrode 111. As the connection manner shown in FIG. 2, because the first electrode block 112 is separated and insulated from the touch electrode 111, and the first electrode block 112 is electrically connected with the touch wire 13 through the second interconnection structure 15, the touch wire 13 can be insulated from the touch electrode 111.

In embodiments of the present disclosure, both of the first interconnection structure and the second interconnection structure penetrate the insulating layer and are arranged uniformly. Thus, graphics uniformity of the display area is guaranteed, and display uniformity of the array substrate and the display panel is improved. Therefore, the problem of low quality display in the conventional display panel, caused by uneven distribution of through holes for connecting the touch electrodes and touch wires in the common electrode layer, can be solved.

Figure 3:
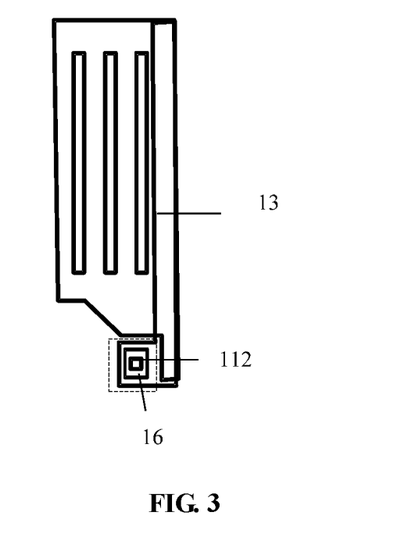
FIG. 3 schematically illustrates a pixel structure diagram of the array substrate in FIG. 2.

FIG. 3 shows a pixel structure diagram of the array substrate shown in FIG. 2. In the array substrate of this embodiment, the touch electrode includes a hollow portion 16. The first electrode block 112 is disposed in the hollow portion 16, and is electrically connected with the touch wire 13 through the second interconnection structure (not shown in FIG. 3).

Figure 4:
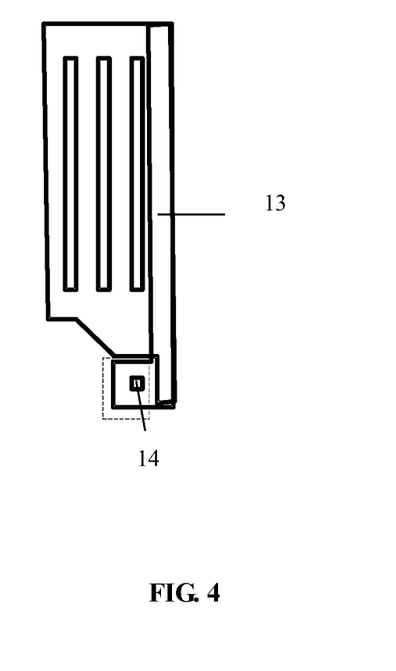
FIG. 4 schematically illustrates a pixel structure diagram of the array substrate in FIG. 1.

FIG. 4 illustrates a pixel structure diagram of the array substrate shown in FIG. 1. Compared with the diagram shown in FIG. 3, the touch electrode in FIG. 4 doesn't include a hollow portion, and the touch electrode is electrically connected with a corresponding touch wire 13 through the first interconnection structure 14.

Figure 5:
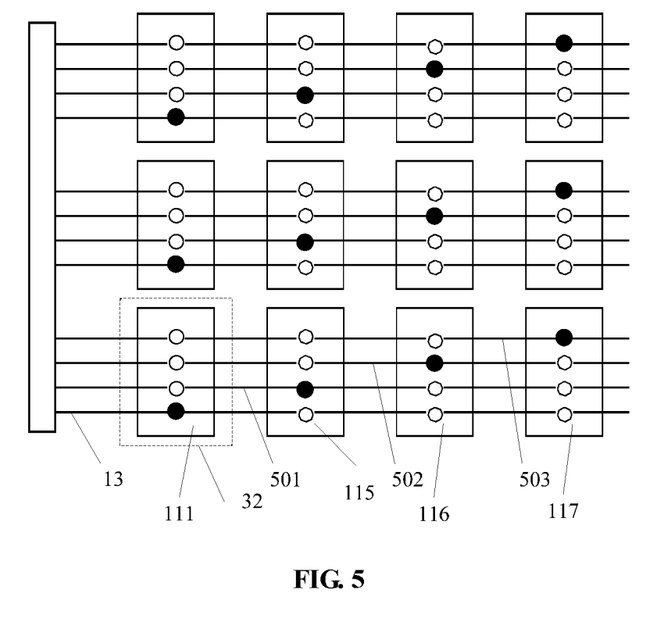
FIG. 5 schematically illustrates a structure diagram of an array substrate according to one embodiment of the present disclosure.

Referring to FIG. 5, a structure diagram of an array substrate is illustrated according to one embodiment of the present disclosure. In the array substrate, a plurality of touch electrodes are arranged in an array, and each row of the array includes n touch electrodes, where n≥2. n touch wires 13 are disposed in each row corresponding to the n touch electrodes. Each touch electrode 111 is electrically connected with one corresponding touch wire 13 through the first interconnection structure, and overlaps, but is insulated from, other (n−1) touch wires. Specifically, as shown in FIG. 3, the hollow portions 16 are disposed at positions of the touch electrode 111 overlapping and being insulated from the other (n−1) touch wires 13. The first electrode blocks 112 are disposed in the hollow portions, and are respectively connected with the rest (n−1) touch wires 13 through the second interconnection structures.

Specifically, in this embodiment, the common electrode layer includes a plurality of touch units 32 arranged in an array. As an example shown in FIG. 5, there are four touch electrodes in each row of the array, but the present disclosure is not limited thereto. Taking four touch electrodes in each row as an example, there are four touch wires 13 corresponding to the four touch electrodes respectively. As shown in FIG. 5, the touch electrode 111 in the first column of the bottom row is electrically connected with the last touch wire 13 through the first interconnection structure, and is insulated from other three touch wires 501, 502 and 503. As the first electrode block is electrically connected with the touch wire 13 through the second interconnection structure, and other touch electrodes 115, 116 and 117 in the last row are in the same layer as the first electrode block and are insulated from the first electrode block, the touch electrodes 115, 116 and 117 are insulated from the touch line 13.

That is, each touch wire 13 is only electrically connected with one touch electrode through one first interconnection structure. In order to make the through holes evenly distributed in the common electrode layer, the touch wire 13 is electrically connected with the first electrode blocks. Because the first electrode block is insulated from the touch electrodes 115, 116 and 117, the touch wire 13 is also insulated from the touch electrodes 115, 116 and 117. Referring to FIG. 5, it can be seen that, there may be a plurality of second through holes disposed above each touch wire 13, and there may be a plurality of second through holes corresponding to each touch unit 32. Besides, the touch wire 13 in each row is coupled to a shift register, and provides a gate signal for the touch unit 32.

Figure 6:
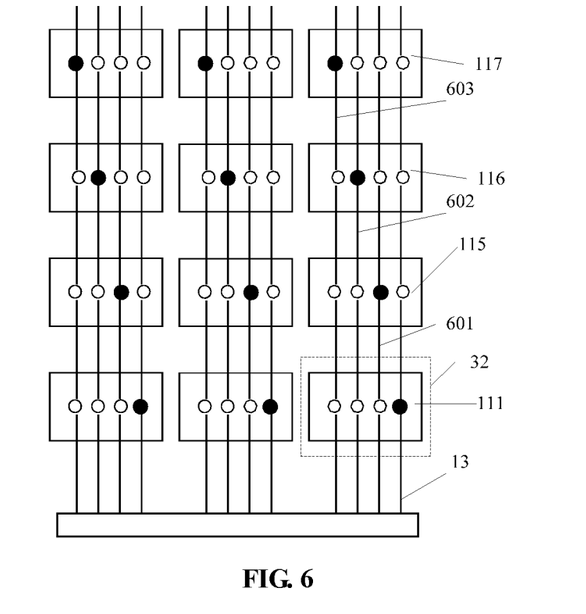
FIG. 6 schematically illustrates another structure diagram of an array substrate according to one embodiment of the present disclosure.

Similarly, as shown in FIG. 6, a structure diagram of an array substrate is illustrated according to one embodiment of the present disclosure. In the array substrate, a plurality of touch electrodes are arranged in an array, and each column of the array includes m touch electrodes, where m≥2. m touch wires 13 are disposed in each column corresponding to the m touch electrodes. Each touch electrode is electrically connected with one corresponding touch wire 13 through a first interconnection structure, and is insulated from other (m−1) touch wires 601, 602 and 603. (m−1) hollow portions are disposed at positions of the touch electrode 111 overlapping and being insulated from the other (m−1) touch wires. As the hollow portions 16 shown in FIG. 3, the first electrode blocks are disposed in the hollow portions, and are respectively electrically connected with the other (m−1) interconnection wires 13 through the second interconnection structures.

Specifically, as shown in FIG. 6, in this embodiment, the common electrode layer is configured to be a plurality of touch unit 32 arranged in an array. For example as shown in FIG. 6, four touch electrodes may be in each column of the array, but the present disclosure is not limited thereto. Taking four touch electrodes in each column as an example, there are four touch wires 13 corresponding to the four electrodes respectively. As shown in FIG. 6, the touch electrode 111 in the last column of the last row is electrically connected with the rightmost touch wire 13 through the first interconnection structure, and is insulated from other three touch wires 601, 602 and 603. Meanwhile, a plurality of hollow portions are successively disposed at insulation portions of the touch electrode 111, where the insulation portions of the touch electrodes 111 are insulated from the touch wires 601, 602 and 603. It should be noted that, as shown in FIG. 6, the hollow portion and the second interconnection structure are disposed at same positions in a direction from outside to inside. As shown in FIG. 3, the first electrode block (not shown in FIG. 6) is disposed in the hollow portion, thus that all of the touch electrodes 115, 116 and 117 are insulated from the touch wire 13.

That is, each touch wire 13 is only electrically connected with one touch electrode through one first interconnection structure. In order to meet uniformity requirements of the touch units, a plurality of second through holes are formed in upper layers above the touch wires 601, 602 and 603. Positions of the plurality of second through holes are corresponding to the touch wires 601, 602 and 603. The touch wire 13 is electrically connected with the first electrode block 112, and the first electrode block 112 is insulated from the touch electrode, thus that the touch wire 13 is insulated from the touch electrode. With reference to FIG. 6, there may be a plurality of second through holes disposed above each touch wire 13, and there may be a plurality of second through holes corresponding to each touch unit 32. Also, the touch wires 13 in each column are connected to a driving IC, so as to provide display drive data signals to the common electrode layer.

Figure 7:
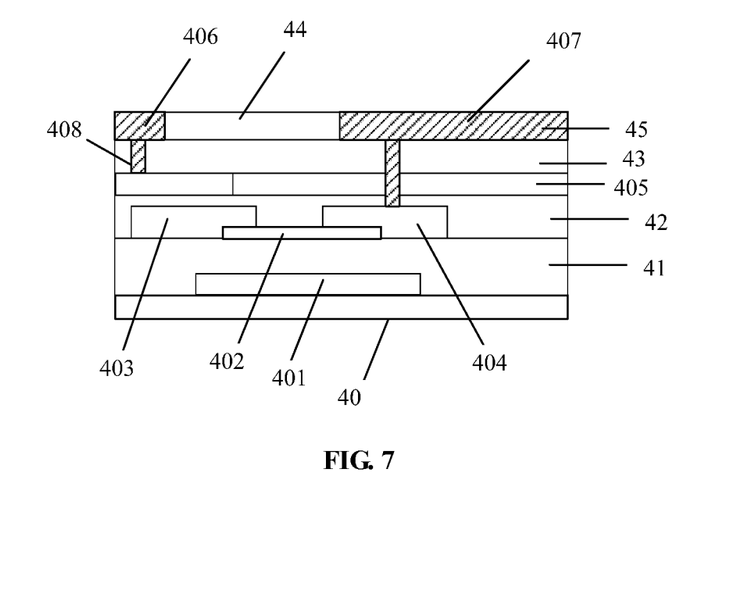
FIG. 7 schematically illustrates another structure diagram of an array substrate according to one embodiment of the present disclosure.
Figure 9:
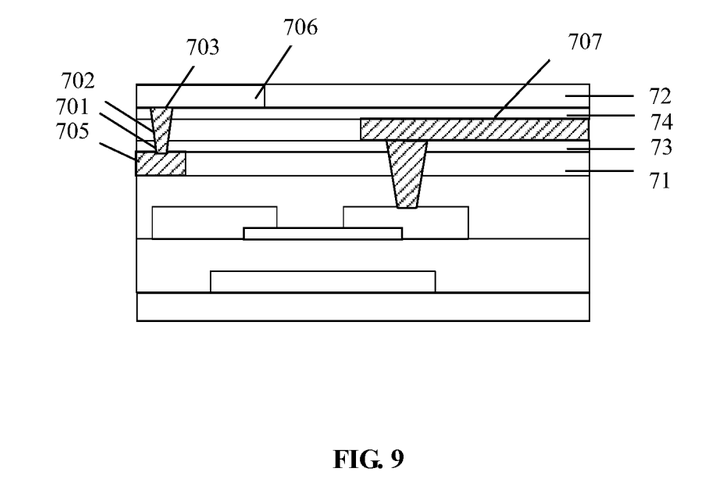
FIG. 9 schematically illustrates another structure diagram of an array substrate according to one embodiment of the present disclosure.

Optionally, in the array substrate provided in embodiments of the present disclosure, the common electrode layer may be disposed above the wire layer as shown in FIG. 9; or the common electrode layer may be disposed under the wire layer as shown in FIG. 7.

Figure 10:
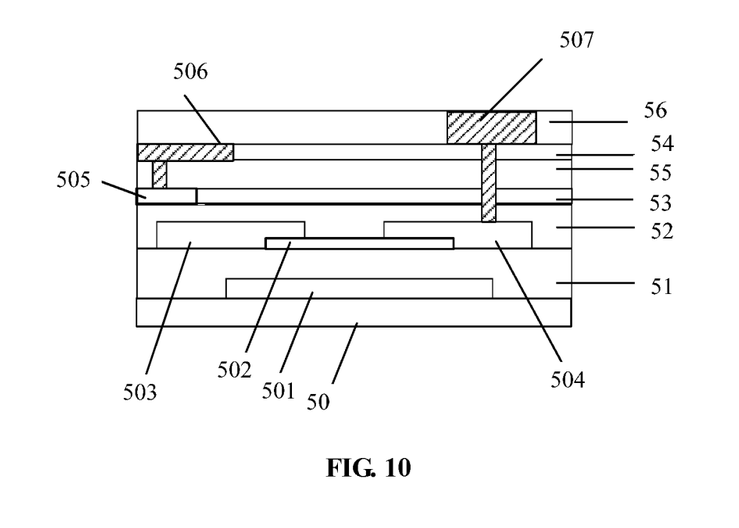
FIG. 10 schematically illustrates another structure diagram of an array substrate according to one embodiment of the present disclosure.

As shown in FIG. 7, the array substrate of this embodiment further includes a pixel electrode, and the pixel electrode is disposed in the wire layer. FIG. 7 illustrates a structure diagram of an array substrate according to one embodiment of the present disclosure. In some embodiments, as shown in FIG. 9, the pixel electrode may be disposed between the wire layer and the common electrode layer. FIG. 9 illustrates a structure diagram of an array substrate according to another embodiment of the present disclosure. Furthermore, FIG. 10 illustrates a structure diagram of an array substrate according to another embodiment of the present disclosure. As shown in FIG. 10, the pixel electrode may be disposed on a side of the wire layer away from the common electrode layer.

Figure 8:
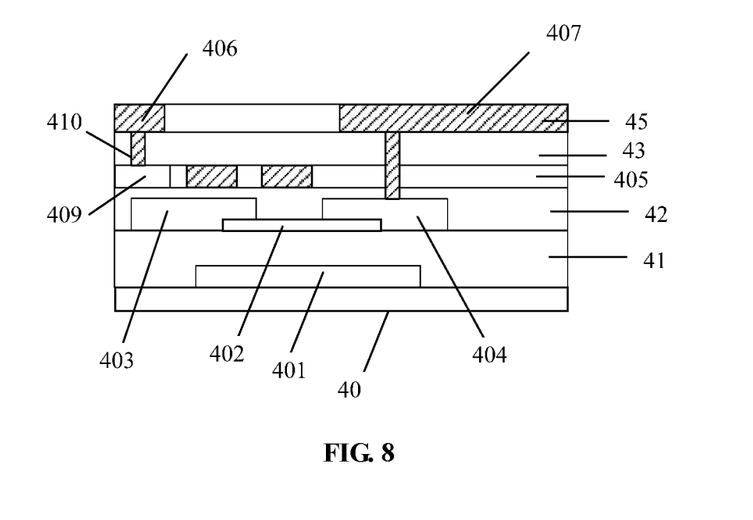
FIG. 8 schematically illustrates another structure diagram of an array substrate according to one embodiment of the present disclosure.

Specifically, referring to FIG. 7, a pixel electrode 407 is disposed in a wire layer 45, and is insulated from a common electrode layer 405 by an insulating layer 43. A touch wire 406 is disposed in a same layer as the pixel electrode 407, and is insulated from the pixel electrode 407. It should be noted that, the pixel electrode 407 and the touch wire 406 don't occupy the entire wire layer 45. FIG. 7 illustrates a cross sectional view showing the pixel electrode 407 being electrically connected with a drain 404 of a thin film transistor through a through hole, but it can't be directly seen that the pixel electrode 407 is insulated from the common electrode layer 405. The first interconnection structure includes a first through hole 408 in the insulating layer 43. Referring to FIG. 8, a partial view of an array substrate is illustrated according to one embodiment of the present disclosure. Compared with FIG. 7, the second interconnection structure in FIG. 8 includes a second through hole 410 in the insulating layer 43, and the first electrode block 409 is electrically connected with the touch wire 406 through the second through hole 410.

Optionally, as shown in FIG. 7 or FIG. 8, the array substrate may include a thin film transistor. The thin film transistor is disposed on a surface of the substrate 40. The thin film transistor includes: a gate 401 and a gate line (not shown in FIG. 8) disposed on the surface of the substrate 40; a gate insulating layer 41 overlapping the gate 401 and the gate line; and an active area 402, a source 403 and a drain 404 disposed on a surface of the gate insulating layer 41. A data line (not shown in FIG. 8) connected with the source 403 is disposed on the surface of the gate insulating layer 41, and the data line is in a same layer as the source 403. A pixel electrode 407 is electrically connected with the drain 404 of the thin film transistor through a through hole.

It should be noted that, as the embodiment shown in FIG. 7, the touch wire 406 and the pixel electrode 407 are disposed in a same layer. Namely, a wire layer is deposited on the insulating layer 43, and then the wire layer is etched to form the pixel electrode and the touch wire, wherein the touch wire 406 and the pixel electrode 407 are insulated from each other. As both the pixel electrode 407 and the touch wire 406 are formed in a conducting layer at once, the production process is simplified, and the production cost is reduced. A third insulating layer 44 is disposed between the pixel electrode 407 and the touch wire 406. In order to protect the touch wire 406 from electromagnetic signal interferences, a wire shield electrode (not shown in FIG. 7) can be disposed on the third insulating layer 44. Only portions of the wire shield electrode and the touch wire 406 are overlapped.

As shown in FIG. 9, the array substrate provided in this embodiment further includes a pixel electrode 707 disposed between the wire layer 71 and the common electrode layer 72. A first insulating layer 73 is disposed between the pixel electrode 707 and the wire layer 71, and a second insulating layer 74 is disposed between the pixel electrode 707 and the common electrode layer 72. That is, the insulating layer between the common electrode layer 72 and the wire layer 71 includes the first insulating layer 73 and the second insulating layer 74.

Optionally, referring to FIG. 9, the first interconnection structure may include a third through hole 701 disposed in the first insulating layer 71, a first conducting pad 702 disposed in a same layer as the pixel electrode, and a fourth through hole 703 disposed in the second insulating layer 74. The second interconnection structure may include a fifth through hole disposed in the first insulating layer, a second conducting pad disposed in a same layer as the pixel electrode, and a sixth through hole disposed in the second insulating layer. Specifically, a method for forming the above components includes: depositing a wire layer 71; etching the wire layer and forming a touch wire 705; depositing a first insulating layer 73 on the wire layer 71; depositing a pixel electrode layer on the first insulating layer 73; etching the pixel electrode layer and forming a pixel electrode 707; depositing a second insulating layer 74 on the pixel electrode layer; depositing a common electrode layer 72 on the second insulating layer 74; etching the common electrode layer 72 and forming a common electrode 706. In order to connect the common electrode 706 with the touch wire 705 electrically, a plurality of through holes are formed in the first insulating layer 73, the pixel electrode layer and the second insulating layer 74. Thus, the third through hole 701, the first conducting pad 702 and the fourth through hole 703 are formed from bottom to top.

As shown in FIG. 10, the pixel electrode 507 is disposed at a side of the common electrode 54 which is far away from the wire layer 53, a third insulating layer 55 is disposed between the pixel electrode 507 and the wire layer 53, or a fourth insulating layer 56 is disposed between the pixel electrode and the common electrode layer. A method for forming the above components includes: depositing a wire layer 53; etching the wire layer 53 and forming the touch wire 505; depositing a third insulating layer 55 on the wire layer 53; depositing a common electrode layer 54 on the third insulating layer 55; etching the common electrode layer 54 and forming a common electrode layer 506. Then, a fourth insulating layer 56 may be deposited on the common electrode layer 54.

Optionally, as shown in FIG. 10, the array substrate further includes a thin film transistor. The thin film transistor is disposed on a surface of the substrate 50. The thin film transistor includes: a gate 501 and a gate line (not shown in FIG. 10) disposed on a surface of the substrate 50; a gate insulating layer 51 overlapping the gate 501 and the gate line; and an active area 502, a source 503 and a drain 504 disposed on a surface of the gate insulating layer 51. A data line (not shown in FIG. 10) connected with the source 503 is disposed on the surface of the gate insulating layer 51, and the data line is in a same layer as the source 503.

In the array substrate, the thin film transistor is disposed on the surface of the substrate 50; the surface of the thin film transistor is covered by the insulating layer 52; the touch wire 505 is disposed on the surface the insulating layer 52; the surface of the touch wire 505 is covered by the insulating layer 53; the common electrode layer 506 is disposed on the surface of the insulating layer 53; the insulating layer 54 is disposed on the surface of the common electrode layer 506; the pixel electrode 507 is disposed on the surface of the insulating layer 54; and the pixel electrode 507 is electrically connected with the source 504 of the thin film transistor by through holes. The touch wire 505 is electrically connected with a touch display electrode corresponding to the common electrode layer 506 by through holes.

It should be noted that, in order to protect the touch wire 505 from electromagnetic signal interferences, a wire shield electrode (not shown in FIG. 10) may be disposed above the touch wire 505. Only portions of the wire shield electrode and the touch wire 505 are overlapped. Specifically, the insulating layer 53 is structured to have a two-layer insulating structure, the wire shield electrode is disposed between the two insulating layer and above the touch wire 505.

Figure 11:
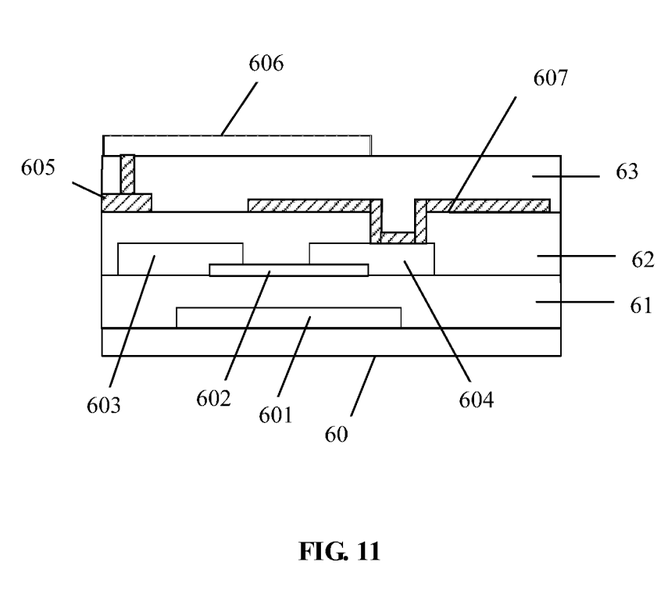
FIG. 11 schematically illustrates another structure diagram of an array substrate according to one embodiment of the present disclosure.

According to another embodiment of the present disclosure, an array substrate is illustrated in FIG. 11. The array substrate includes a thin film transistor disposed on a surface of the substrate 60. The thin film transistor includes: a gate 601 and a gate line (not shown in FIG. 11) disposed on a surface of the substrate 60; a gate insulating layer 61 overlapping the gate 601 and the gate line; and an active area 602, a source 603 and a drain 604 disposed on a surface of the gate insulating layer 61. A data line (not shown in FIG. 11) connected with the source 603 is disposed on the surface of the gate insulating layer 61, and the data line is in a same layer as the source 603.

In the array substrate shown in FIG. 11, the thin film transistor is disposed on the surface of the substrate 60; the surface of the thin film transistor is cover by a first insulating layer 62; the touch wire 605 and the pixel electrode 607 are disposed on the surface of the first insulating layer 62; the pixel electrode 607 is electrically connected with the drain 604 of the thin film transistor by through holes; a second insulating layer 63 is disposed on surfaces of the touch wire 605 and the pixel electrode 607; and the common electrode layer 606 is disposed on the surface of the second insulating layer 63.

In the implementation shown in FIG. 11, the touch wire 605 and the pixel electrode 607 are disposed in a same layer. Because both of the touch wire 605 and the pixel electrode 607 can be formed in a conducting layer at once, the production process is simplified, and the production cost is reduced. In order to protect the touch wire 605 from electromagnetic signal interferences, a wire shield electrode (not shown in FIG. 11) can be disposed above the touch wire 605. Only portions of the wire shield electrode and the touch wire 605 are overlapped. Specifically, the insulating layer 63 is structured to have a two-layer insulating structure, and the wire shield electrode is disposed between the two insulating layer and above the touch wire 605.

Optionally, in the array substrate provided in this embodiment, the plurality of touch wires have a same length, which is beneficial for forming uniform wire routing. In some embodiments, both of a length and a width of the first electrode block are less than or equal to 5 μm, which can reduce its impact on the display area.

Figure 12:
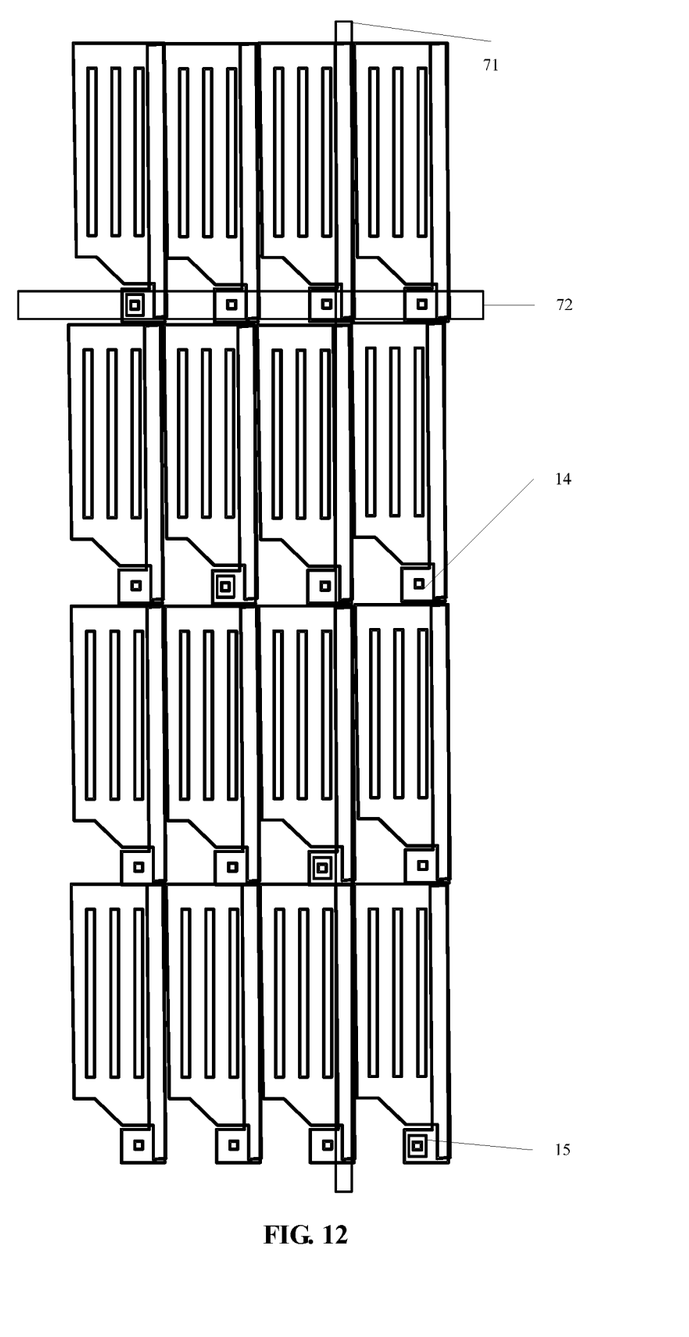
FIG. 12 schematically illustrates another structure diagram of an array substrate according to one embodiment of the present disclosure.

According to one embodiment of the present disclosure, an array substrate is illustrated in FIG. 12. The array substrate in this embodiment further includes a plurality of gate lines 72 and a plurality of data lines 71. The plurality of gate line 72 and the plurality of data lines 71 are crossed to define a plurality of pixel units arranged in an array, wherein the plurality of gate lines 72 are insulated from the plurality of data lines 71. Each row or each column of the array includes K pixel units, K≥2. Each touch wire is disposed between two adjacent rows of pixel units, or between two adjacent columns of pixel units. In the two adjacent rows or the two adjacent columns, at least one pixel unit includes the first interconnection structure, and at most (K−1) pixel units include the second interconnection structures.

It can be easily found from the figure that, the array substrate not only includes a connection mode through the first interconnection structure, but also includes a connection mode through the second interconnection structure. Optionally, referring to FIG. 12, both the first interconnection structure 14 and the second interconnection structure 15 are disposed in a same row of pixel units or a same column of pixel units. Besides, in some embodiments, each row may not only includes pixel units connected with the touch wire through the first interconnection structure, but also includes pixel units connected with the touch wire through the second interconnection structure. As both the first interconnection structure and the second interconnection structure in embodiments of the present disclosure penetrate the insulating layer and are evenly distributed, a problem of low quality display, caused by uneven distribution of the through holes for connecting touch electrodes with touch wires in the common electrode layer, can be solved.

Figure 13:
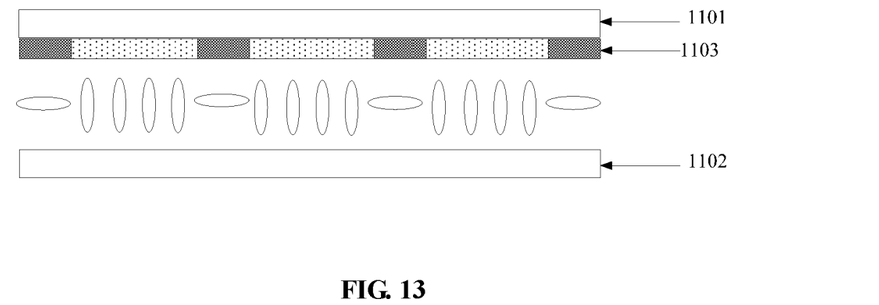
FIG. 13 schematically illustrates a structure diagram of a touch panel according to one embodiment of the present disclosure.

Also, a display panel is also provided in embodiments of the present disclosure. As shown in FIG. 13, the display panel includes a color film substrate 1101 disposed opposite to the array substrate 1102 according to any embodiment described above. In order to prevent light leakage, a light shielding layer 1103 is disposed at a side of the color film substrate 1101 towards the array substrate 1102, and both the wire layer and the first electrode block are disposed below the light shielding layer 1103.

In above embodiments, the present disclosure provides an array substrate and a display panel of a self-capacitive touch display panel. The array substrate includes: a common electrode layer; a wire layer; an insulating layer; a first electrode block; a plurality of first interconnection structures and a plurality of second interconnection structure, wherein the common electrode layer includes a plurality of touch electrodes, the wire layer includes a plurality of touch wire, and the insulating layer is disposed between the common electrode layer and the wire layer. Each touch electrode is electrically connected with a corresponding touch wire through the first interconnection structure. The first electrode block is in the same layer as the common electrode layer, and is separated and insulated from the plurality of touch electrodes. The first electrode block is also electrically connected with the touch wire through the second interconnection structure.

In the array substrate of the present disclosure, as both the first interconnection structure and the second interconnection structure in embodiments of the present disclosure penetrate the insulating layer and are evenly distributed, the problem of low quality display in the conventional technology, caused by uneven distribution of through holes for connecting touch electrodes with the touch wires in the common electrode layer, can be solved.

Although the present disclosure has been disclosed above with reference to preferred embodiments thereof, it should be understood by those skilled in the art that various changes may be made without departing from the spirit or scope of the disclosure. Accordingly, the present disclosure is not limited to the embodiments disclosed.

What is claimed is:

1. An array substrate for a self-capacitive touch display panel, comprising:
   a common electrode layer comprising a plurality of touch electrodes arranged in an array, each column of the array comprising m touch electrodes, wherein m≥2;
   a wire layer comprising a plurality of touch wires;
   an insulating layer disposed between the common electrode layer and the wire layer, wherein each touch electrode is electrically connected with a corresponding touch wire through a first interconnection structure; and
   a plurality of first electrode blocks disposed in a same layer as the common electrode layer, wherein the plurality of first electrode blocks are separated and insulated from the plurality of touch electrodes wherein the m touch electrodes in the same column correspond to m touch wires, wherein each of the m touch electrodes is electrically connected with one corresponding touch wire through the first interconnection structure, and the m touch electrodes overlaps and is insulated from the rest (m−1) touch wires; and
   wherein a plurality of hollow portions are disposed in a portion of the touch electrode where the touch electrode overlaps and be insulated from the rest (m−1) touch wires, and the plurality of first electrode blocks are disposed in the plurality of hollow portions and are electrically connected with the rest (m−1) touch wires through the plurality of second interconnection structures respectively.

2. The array substrate according to claim 1, wherein the plurality of touch wires have a same length.

3. The array substrate according to claim 1, wherein the common electrode layer is disposed below or above the wire layer.

4. The array substrate according to claim 1, further comprising: a pixel electrode disposed in the wire layer, wherein the pixel electrode is insulated from the common electrode layer by the insulating layer, the plurality of touch wires and the pixel electrode are disposed in a same layer and are insulated from each other, the first interconnection structure comprises a first through hole disposed in the insulating layer, and the second interconnection structure comprises a second through hole disposed in the insulating layer.

5. The array substrate according to claim 1, further comprising: a pixel electrode disposed between the wire layer and the common electrode layer,
   wherein a first insulating layer is disposed between the pixel electrode and the wire layer, a second insulating layer is disposed between the pixel electrode and the common electrode layer, the insulating layer between the common electrode layer and the wire layer comprises the first insulating layer and the second insulating layer.

6. The array substrate according to claim 5, wherein the first interconnection structure comprises a third through hole disposed in the first insulating layer, a first conductive pad disposed in a same layer as the pixel electrode, and a fourth through hole disposed in the second insulating layer; and
   wherein the second interconnection structure comprises a fifth through hole disposed in the first insulating layer, a second conductive pad disposed in the same layer as the pixel electrode, and a sixth through hole disposed in the second insulating layer.

7. The array substrate according to claim 1, further comprising: a pixel electrode,
   wherein the pixel electrode is disposed on a side of the wire layer away from the common electrode layer; and
   wherein a third insulating layer is disposed between the pixel electrode and the wire layer, or a fourth insulating layer is disposed between the pixel electrode and the common electrode layer.

8. The array substrate according to claim 1, wherein both a length and a width of the first electrode block are less than or equal to 5 μm.

9. The array substrate according to claim 1, further comprising: a plurality of gate line and a plurality of data line,
   wherein the plurality of gate lines and the plurality of data lines are crossed to define a plurality of pixel units arranged in an array, the plurality of gate lines are insulated from the plurality of data lines, each row or each column of the array comprises K pixel units, and K≥2; and
   wherein each touch wire is disposed between two adjacent rows of pixel units or between two adjacent columns of pixel units, in the two adjacent rows or the two adjacent columns, at least one pixel unit comprises the first interconnection structure, and at most (K−1) pixel units comprise the second interconnection structure.

10. The array substrate according to claim 9, wherein the first interconnection structure and the second interconnection structures are disposed in a same row or a same column of pixel units.

11. A display panel, comprising:
   the array substrate according to claim 1;
   a color film substrate disposed opposite to the array substrate; and
   a light shielding layer disposed on a side of the color film substrate towards the array substrate, wherein the wire layer and the first electrode block are disposed below the light shielding layer.

* * * * *